United States Patent [19]

Olmstead et al.

[11] Patent Number: 5,002,118
[45] Date of Patent: Mar. 26, 1991

[54] HEAT RECOVERY SYSTEM

[75] Inventors: Richard W. Olmstead; Douglas B. Wicks, both of Saskatchewan, Canada

[73] Assignee: Olmstead Research Inc., Saskatoon, Canada

[21] Appl. No.: 469,371

[22] Filed: Jan. 16, 1990

[51] Int. Cl.$^5$ .......................... F24H 3/02; F24H 3/10; F24F 7/08
[52] U.S. Cl. ....................................... 165/54; 165/17; 165/913; 165/166
[58] Field of Search .................. 165/54, 909, 913, 17, 165/166; 98/33.1

[56] References Cited

U.S. PATENT DOCUMENTS

| | | | |
|---|---|---|---|
| 1,825,498 | 9/1931 | Wogan | 165/909 |
| 2,934,324 | 4/1960 | Partington . | |
| 3,049,067 | 8/1962 | Claude . | |
| 3,106,146 | 10/1963 | La Vigne . | |
| 3,227,062 | 1/1966 | Andersson . | |
| 3,263,400 | 8/1966 | Hoke et al. . | |
| 3,302,547 | 2/1967 | Wasserman . | |
| 3,666,007 | 5/1972 | Yoshino et al. | 165/909 |
| 3,694,222 | 9/1972 | Pardoel et al. . | |
| 4,159,590 | 4/1979 | Ospelt | 165/909 |
| 4,210,200 | 7/1980 | Vary . | |
| 4,334,577 | 6/1982 | George . | |
| 4,377,201 | 3/1983 | Kruse et al. | 165/909 |
| 4,391,321 | 7/1983 | Thunberg . | |
| 4,461,344 | 7/1984 | Allen et al. | 165/909 |
| 4,462,459 | 7/1984 | Schmidlin . | |
| 4,512,392 | 4/1985 | van Ee et al. | 165/909 |
| 4,550,773 | 11/1985 | Martin | 165/54 |
| 4,665,805 | 5/1987 | Ekman . | |
| 4,691,763 | 9/1987 | Kennedy | 165/54 |
| 4,708,197 | 11/1987 | Robbins | 165/54 |
| 4,727,931 | 3/1988 | Berner | 165/909 |
| 4,781,240 | 11/1988 | Cliff . | |
| 4,811,656 | 3/1989 | Meendering . | |

FOREIGN PATENT DOCUMENTS

| | | | |
|---|---|---|---|
| 2844885 | 4/1980 | Fed. Rep. of Germany | 165/54 |
| 0041444 | 3/1977 | Japan | 165/54 |
| 0006247 | 1/1982 | Japan | 165/54 |
| 0155043 | 9/1982 | Japan | 165/54 |
| 2095394 | 9/1982 | United Kingdom | 165/54 |

*Primary Examiner*—John Ford
*Attorney, Agent, or Firm*—Stanley G. Ade; Murray E. Thrift; Adrian D. Battison

[57] ABSTRACT

A vertically situated head exchanger is mounted externally of a building and insulated relative to the ambient air. Fan units are situated within the building preferably between adjacent joists and in the basement and in alignment with the connections to the heat exchanger. One fan unit draws fresh air from outside the building, through the heat exchanger and into the building. Another fan unit draws exhaust air from the building and passes this through the heat exchanger thus giving up heat to the cool incoming air and is then exhausted externally of the building. A controlled duct may draw warm air from the building and pass it through the heat exchanger to defrost same when necessary.

7 Claims, 6 Drawing Sheets

HEAT RECOVERY SYSTEM

This invention relates to new and useful improvements in heat recovery systems, and although designed primarily for use within resident-type houses, nevertheless it will be appreciated that it can readily be adapted for use in other buildings, commercial or otherwise.

Present heat recovery units are situated entirely within a building such as a residence with ducting extending from the unit to externally of the building firstly to draw in fresh outside air and secondly to exhaust stale air from which the majority of heat has been extracted and transferred to the incoming fresh air via a heat exchanger unit.

Such units normally consist of a casing or cabinet containing the heat exchanging unit or units, necessary filtration means and a fan unit for each of the two air paths, namely, the fresh air intake path and the exhaust air discharge path so that it will be appreciated that such units are relatively large and are awkward to install particularly if the house or residence is not provided with a basement. Even with a basement, the units take up considerable room and in most instances, relatively long lengths of insulated ducting are required between the unit and external air of the building.

The present invention overcomes many of the disadvantages inherent with such installations by providing an externally situated heat exchange unit connected by two ducts to a fan unit, one for the incoming air and one for the outgoing air. These ducts do not need to be insulated and preferably may be situated within the ceiling joists of a basement as may be the two fan units. The supply fan unit may then be connected relatively simply to the air circulating means such as a furnace.

In accordance with the invention there is provided a heat recovery system comprising in combination a vertically situated heat exchanger module mounted externally of a building and including a cabinet insulated relative to the external ambient air and having at least one vertically situated heat exchanger element therein, said element having a fresh air path and an exhaust air path at right angles to said fresh air path with heat exchanging walls therebetween, said fresh air path including a fresh air intake side operatively connected to the ambient air externally of the building and a fresh air discharge side operatively connecting within the building, said exhaust air path having an exhaust air intake side operatively connected within the building and an exhaust air discharge side operatively connected with the ambient air externally of the building, air filters for each said path and fan means situated within the building each operatively connected one to said fresh air path and the other to said exhaust air path.

The system is designed so that the cabinet containing the heat exchange units is readily situated on a convenient outside wall of a house or, preferably, partially inserted between two of the vertical studs of the wall during house construction. This means that the exterior of the cabinet can be matched to the exterior finish of the house whether it be siding, stucco or the like.

Another advantage of the invention is that the heat exchange units are preferably cubicle and are situated so that both the supply air pathway and the exhaust air pathways slope downwardly so that they are self-draining thus reducing the danger of freeze-up particularly when used in relatively cold climates. Under these circumstances of course if will be appreciated that the cabinet containing the heat exchange units externally of the house should be insulated.

Another advantage of the invention is to provide a device of the character herewithin described which is simple in construction, economical in manufacture, and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 2:
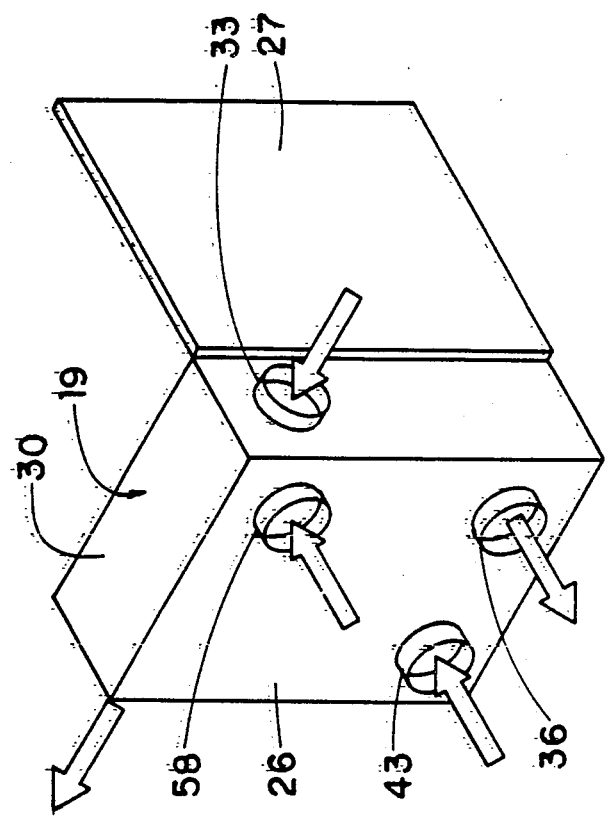
FIG. 2A is a partially schematic isometric view of the cabinet with the door in the open position.
FIG. 2B is a view from the inside of the house once again with the door in the open position.
FIG. 2C is a schematic view showing the operation of the heat exchanger.
Figure 2:
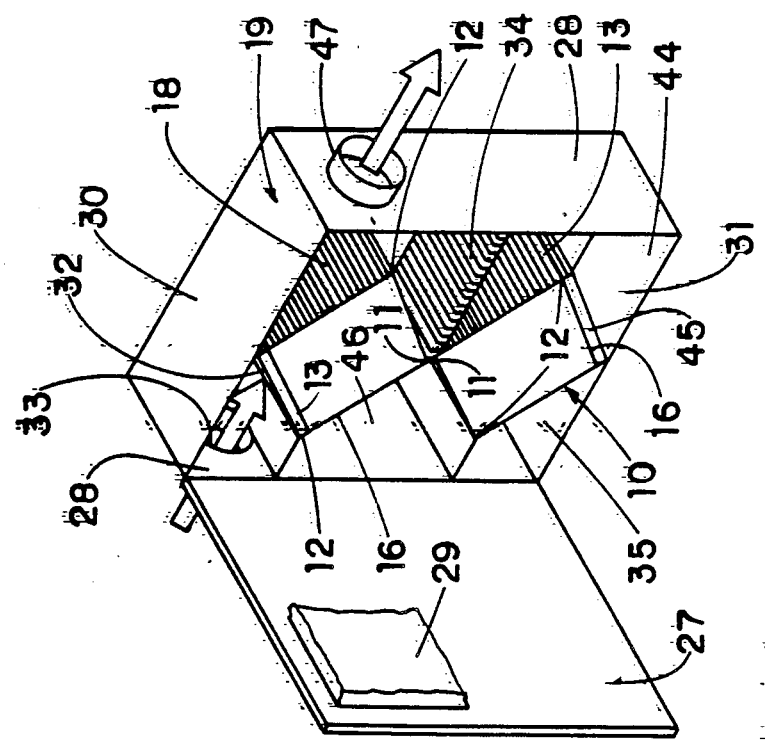

Proceeding therefore to describe the invention in detail, reference should first be made to FIG. 2C which shows schematically the preferred construction of the heat exchanger unit collectively designated 10.

This is shown in detail in U.S. Pat. No. 4,512,392, dated Apr. 23, 1985 and which is incorporated by reference.

Briefly, it is cubicle in configuration and is mounted so that the two corners 11 are situated vertically one above the other and the other two corners 12 are situated horizontally. One rectangular side 13 acts as the fresh air intake of a fresh air path travelling in the direction of arrows 14 and discharging at the opposite side indicated by reference character 15 which is the fresh air discharge side.

Figure 1A:
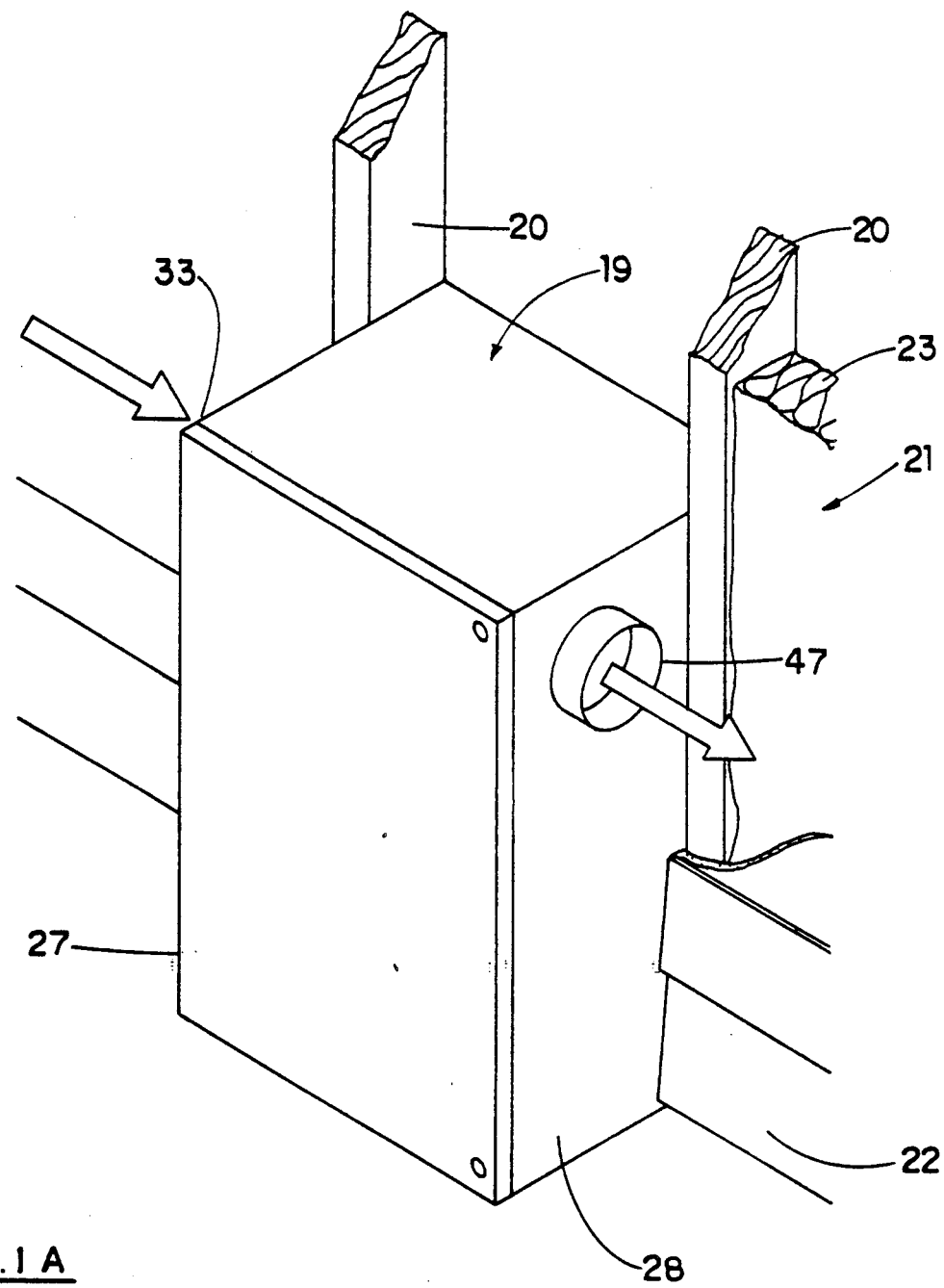
FIG. 1A is a fragmentary isometric view showing the cabinet in its preferred mounting location partially between a pair of vertical studs.

The lowermost left hand rectangular side 16 is the exhaust air intake for the exhaust air path indicated by arrows 17 and this extends to the opposite rectangular side 18 which is the exhaust air discharge side so that the two paths 14 and 17 travel at right angles to one another and independently of one another but pass common walls so that a heat exchange action takes place with the wall exhaust air from the interior of the building giving up heat to the fresh cooler air coming from externally of the building. The heat exchanger units 10 are situated within a cabinet collectively designated 19 and which is situated externally of the building as shown schematically in FIGS. 1A and 1B. This cabinet is preferably recessed between a pair of adjacent vertical studs 20 forming the frame for the outer wall 21 which may be finished with siding 22 or the like and includes insulation 23 between adjacent studs 20.

Figure 1B:
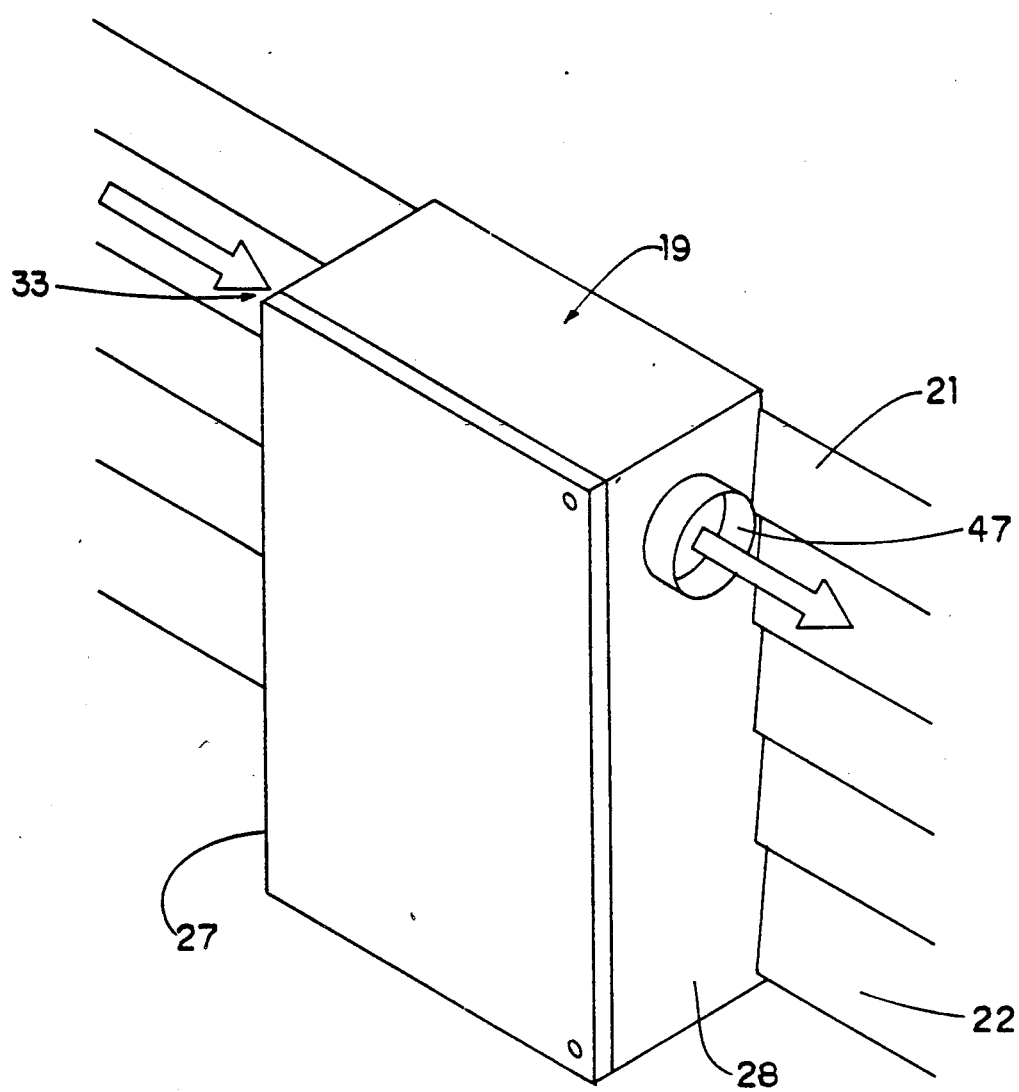
FIG. 1B is a view similar to FIG. 1A but showing the cabinet mounted against the outer surface of the wall of a house.

Alternatively, it may be face mounted to the wall 21 as shown in FIG. 1B.

Figure 3:
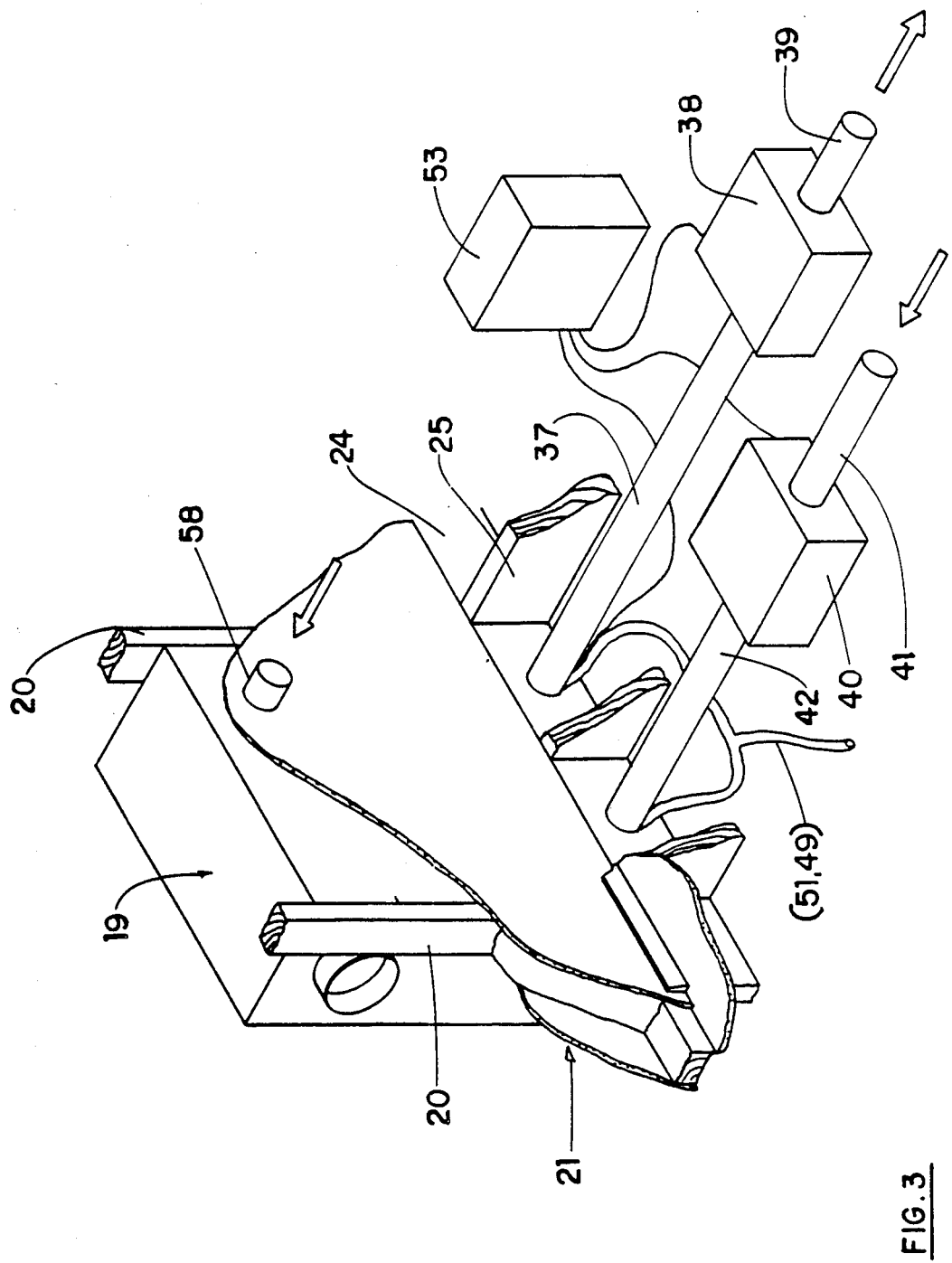
FIG. 3 is a schematic partially broken away view showing the preferred method of installation of the system.

It is preferably mounted adjacent the basement ceiling 24 (see FIG. 3) defined by spaced and parallel first floor joists 25 all of which is conventional.

The cabinet 19 includes a substantially vertically inner wall 26, a substantially vertical outer wall 27 and vertical side walls 28 extending therebetween with the outer wall 27 taking the form of a door hinged to the outer edge 29 of one of the side walls 28 as shown in FIGS. 2A and B. The cabinet is preferably insulated as shown schematically by reference character 29 and contains the aforementioned heat exchange unit 10. Although two such units are shown in the drawings, nevertheless it will be appreciated that a single unit 10 may be provided if desired.

However, in the present embodiment, two units are provided one above the other with the corners 12 in contact with the inside of the inner walls 28 to isolate the paths 14 and 17 on from the other.

The casing is completed by an upper wall 30 and a lower wall 31 as illustrated.

Spanning the fresh air intake side 13 of the uppermost heat exchanger, is a primary supply filter 32 and the area above this filter communicates exteriorally of the building through a fresh air intake duct 33 formed through one vertical wall 29 adjacent the upper side thereof.

A secondary fresh air supply filter 34 extends between the junction of the two vertical corners 11 of the upper and lower heat exchange units 10, and the other side wall 28 as shown schematically in FIG. 2A. The fresh air discharge side 15 of the uppermost heat exchanger communicates fire filter 34 with the air intake side 13 of the lowermost heat exchanger 10 and then discharges into the area 35 from the discharged side 12 of the lowermost heat exchanger. It then passes through a collar 36 in the rear wall 26 of the cabinet adjacent one lower corner thereof as shown in FIG. 2B and connects to a duct 37 shown in FIG. 3 and preferably situated between adjacent joists 25, to a fresh air supply fan assembly 38 also situated between adjacent joists. It may then be connected by ducting 39 to the air circulation system (not illustrated) of the house or residence.

An exhaust fan assembly 40 is situated between adjacent joists 25 preferably in side by side relationship with the supply fan assembly 38. It connects to the exhaust side of the air circulation assembly via duct 41 and discharges through duct 42, into a collar 43 which in turn extends through the rear wall 26 of the cabinet 19 adjacent the opposite corner to the collar 36.

This enters the cabinet in the area 44 and passes upwardly through an exhaust filter 45 and into the exhaust intake side 16 passing through the exhaust path of the lowermost heat exchange unit 10 into the area 46 and thence into the intake side 16 of the uppermost heat exchanger unit to be discharged through the exhaust air discharge side 18 and thence externally of the building through a duct 47 situated in the side wall 28 of the cabinet adjacent the upper end thereof as clearly shown schematically in FIGS. 2A and 2B.

It will be noted that FIG. 2C illustrates the path of the air flow of the uppermost heat exchanger 10 and that these paths are reversed for the lowermost heat exchanger.

Figure 4:
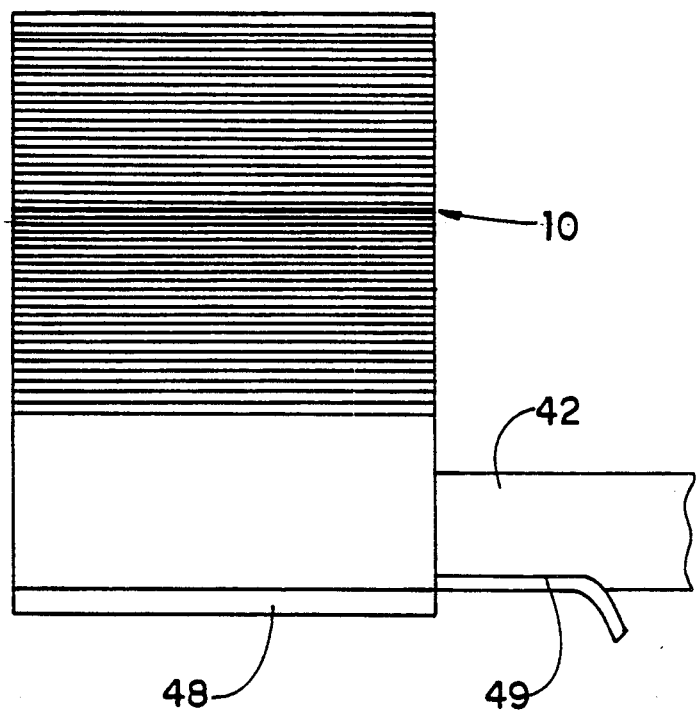
FIG. 4 is a partially schematic side view of the heat exchanger showing the exhaust side thereof.

In both cases, however, the paths are situated diagonally approximately 45° from the vertical of the cabinet and of the units so that they are self draining and any moisture including moisture caused by defrosting as will hereinafter be described, drains downwardly to the corresponding drain pans shown in FIGS. 4 and 5. FIG. 4 shows a drain pan 48 collecting moisture from the exhaust paths of the cores from whence it may drain through a drain hose 49 into the exhaust duct 42 between the joists and then through the duct to a convenient drainage disposal means.

Figure 5:
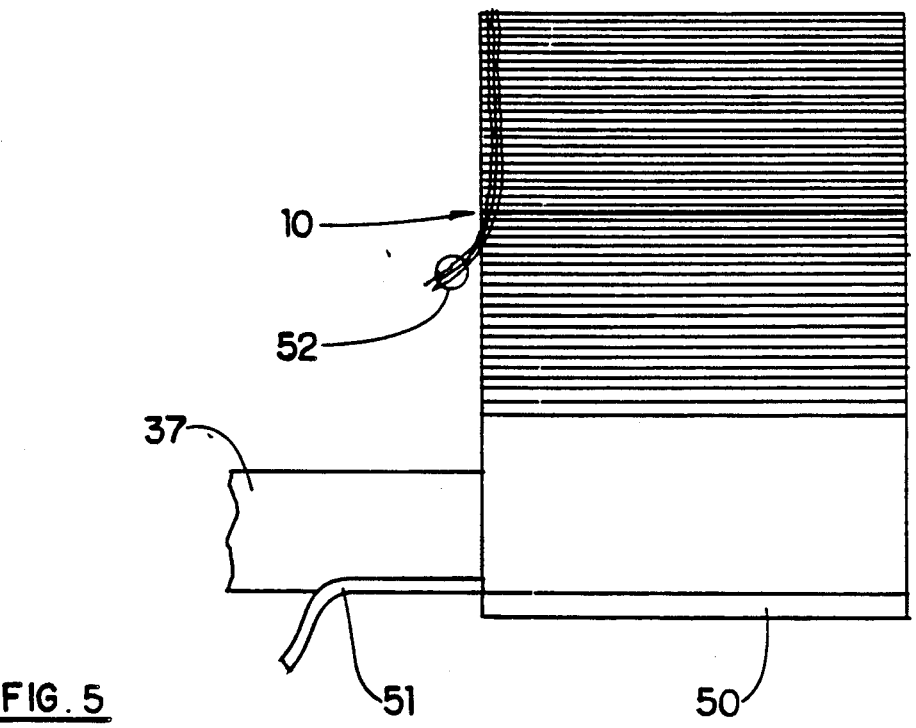
FIG. 5 is a view similar to FIG. 4 but showing the supply duct side.
Figure 6:
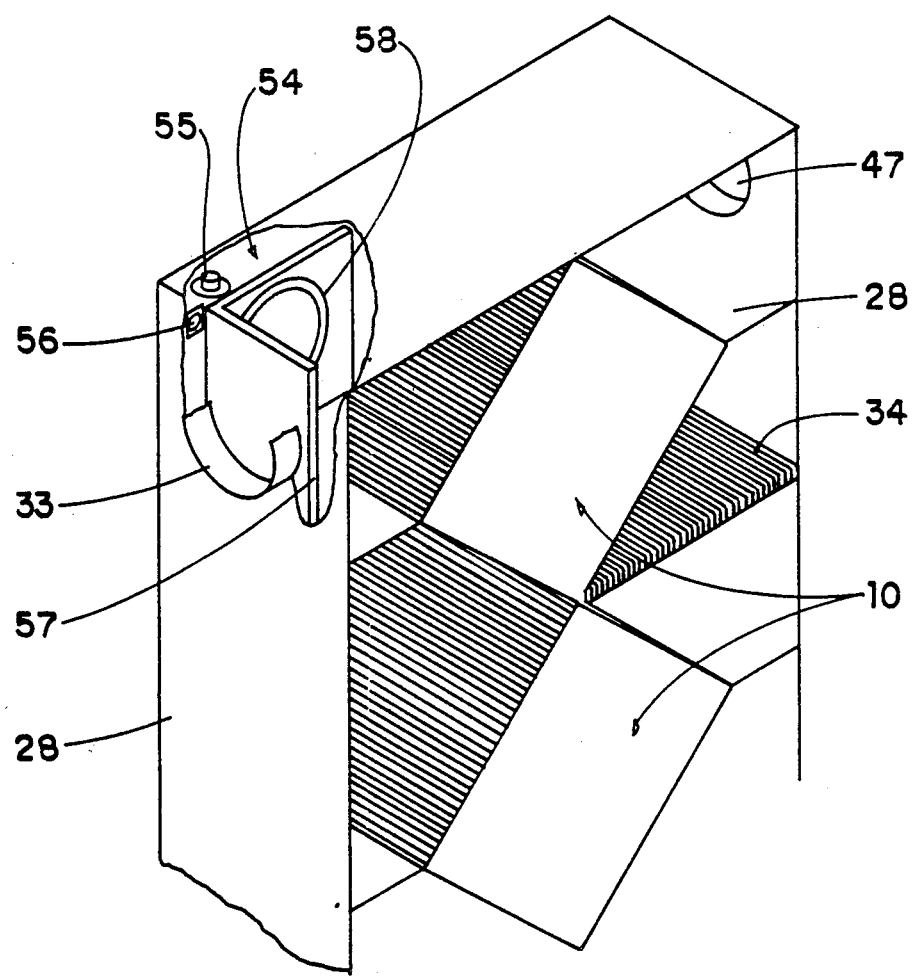
FIG. 6 is a partially broken away isometric view of the cabinet showing the defrost assembly.
Figure 2:
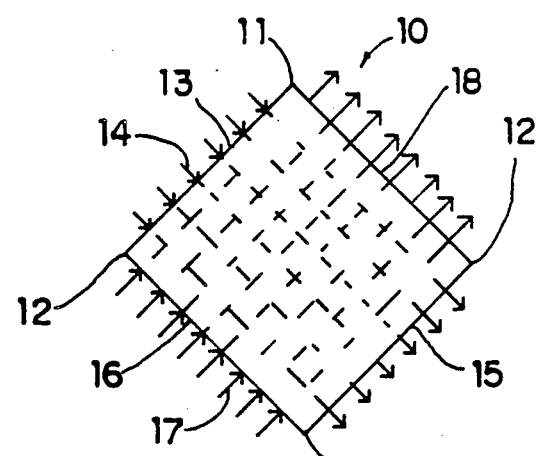

In FIG. 5, the drain pan is illustrated by reference character 50 and receives the moisture from the air intake paths and disposes of same through a drain hose 51 extending through the lower wall of the fresh air supply duct 37 to the same disposal area as drain hose 49. The supply duct or fresh air duct 37 also carries 24 volt wiring 52 from a control box 53 and this extends upwardly alongside the heat exchangers to a defrost assembly shown in FIG. 6 and collectively designated 54.

It controls an electric motor shown schematically at 55 via a temperature sensor 56 and also controls a damper blade 57 which closes off the outside fresh air intake collar 33 during the defrost cycle.

When this damper 57 is in the closed position, the motor 55 operates and draws relatively warm air through a collar 58 in the rear wall 26 of the cabinet and which of course is communicating with the relatively warm air from the interior of the building. This is circulated through the fresh air paths of the heat exchangers thus defrosting same and the control box controls the cycle of the defrost sequence so long as the outside ambient air temperature is below freezing. Any moisture caused by the defrosting is of course picked up by the drain trays or pans 48 and 50.

It will therefore be seen that the insulation and construction of the heat recovery unit is relatively simple and straight forward and eliminates many of the problems commonly existing with present constructions. These include the elimination of relatively lengthly insulated ducts, the provision of the cabinet containing the heat exchange units exteriorally of the building rather than interiorally thereof and relatively straightforward ductwork.

The fan assemblies 38 and 40 are also wired to the control box which can be situated conveniently and controlled by remote controls in a conventional manner.

Because of the configuration of the system and the flexibility of the positioning of the various components, several options become apparent. For example, an extensive filter system can be added to the incoming air stream and the supply fan assembly 38 specifications can be changed to accommodate the static resistance of the filters. The size of the fan assemblies is not restricted and the controls can be changed to accommodate many different configurations. It is preferable that the control box consist of an easily programmable computer type control readily available.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed:

1. A heat recovery system comprising in combination a vertically situated heat exchanger module mounted externally of a building and including a cabinet insulated relative to the external ambient air and having at least one vertically situated heat exchanger element therein, said element comprising air path means defining a fresh air path and an exhaust air path at right angles to said fresh air path, said air path means including heat exchanging walls between the fresh air path and the exhaust air path, said fresh air path including a fresh air intake side operatively connected to the ambient air externally of the building and a fresh air discharge side operatively connecting within the building, said exhaust air path having an exhaust air intake side operatively connected within the building and an exhaust air discharge side operatively connected with the ambient air externally of the building, air filters for each said path, fan means situated within the building each operatively connected one to said fresh air path and the other to said exhaust air path, and a temperature controlled defrost assembly operatively extending between the interior of the building, into said cabinet adjacent the intake side of said fresh air path, said defrost assembly including a damper within said intake side and a fan unit within said cabinet operatively extending between the interior of the building and said intake side of said fresh air path, said damper closing off the connection between said fresh air intake side and external ambient air when said fan unit is operating and vice versa, said fan unit recirculating relatively warm air from the interior of the building, through the fresh air path of said heat exchanger element.

2. The system according to claim 1 in which said module is substantially cubical and oriented with each of said fresh air and said exhaust air paths at substantially 45° from the vertical whereby said paths are self draining, and drain tray means at the lower end of said paths.

3. The system according to claim 1 which includes two heat exchanger units one situated vertically above the other with said fresh air path of said upper unit operatively connecting with the fresh air path of said lower unit and said exhaust path of said lower unit operatively connecting with said exhaust path of said upper unit.

4. The system according to claim 2 which includes two heat exchanger units one situated vertically above the other with said fresh air path of said upper unit operatively connecting with the fresh air path of said lower unit and said exhaust path of said lower unit operatively connecting with said exhaust path of said upper unit.

5. The system according to claim 1 in which said cabinet includes an inner substantially vertical wall situated within the building and an outer vertical wall situated externally of the building with substantially vertical side, upper and lower walls extending therebetween, the said outer wall taking the form of a door hinged to one of said side walls for opening and closing said cabinet, said heat exchanger unit being substantially cubical and so oriented within said cabinet that the fresh air path extends substantially diagonally downwardly from adjacent one side wall of said cabinet towards the other side wall thereof, said fresh air intake side communicating through said one side wall of said cabinet, said exhaust air discharge side communicating through the opposite side wall of said cabinet, said fresh air discharge side communicating through said inner substantially vertical wall of said cabinet, said exhaust intake side also connecting through said inner substantially vertical wall of said cabinet.

6. The system according to claim 5 which includes two heat exchanger units one situated vertically above the other with said fresh air path of said upper unit operatively connecting with the fresh air path of said lower unit and said exhaust path of said lower unit operatively connecting with said exhaust path of said upper unit.

7. The system according to claim 5 in which said fresh air discharge side and said exhaust air intake side communicate through said inner wall of said cabinet between adjacent joists within said building and ducts extending from said fresh air discharge side and said exhaust air intake side and said corresponding fan means.

* * * * *